(12) United States Patent  
Brinkert et al.

(10) Patent No.: US 12,345,187 B2
(45) Date of Patent: Jul. 1, 2025

(54) INTERNAL COMBUSTION ENGINE FOR A MOTOR VEHICLE, IN PARTICULAR FOR A MOTOR CAR

(71) Applicant: Mercedes-Benz Group AG, Stuttgart (DE)

(72) Inventors: Nils Brinkert, Ludwigsburg (DE); Hardy Weymann, Oberndorf (DE); Marvin Schattner, Esslingen am Neckar (DE); Markus Fenzl, Forchtenberg (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/253,020

(22) PCT Filed: Oct. 15, 2021

(86) PCT No.: PCT/EP2021/078564
§ 371 (c)(1),
(2) Date: May 15, 2023

(87) PCT Pub. No.: WO2022/100956
PCT Pub. Date: May 19, 2022

(65) Prior Publication Data
US 2023/0417167 A1 Dec. 28, 2023

(30) Foreign Application Priority Data
Nov. 16, 2020 (DE) ..................... 10 2020 007 000.0

(51) Int. Cl.
*F01N 13/00* (2010.01)
*F01N 1/14* (2006.01)
(Continued)

(52) U.S. Cl.
CPC ............. *F01N 13/009* (2014.06); *F01N 1/14* (2013.01); *F01N 3/025* (2013.01); *F01N 3/2033* (2013.01);
(Continued)

(58) Field of Classification Search
CPC .......... F01N 1/14; F01N 3/025; F01N 3/2033; F01N 3/22; F01N 3/30; F01N 2240/14;
(Continued)

(56) References Cited

U.S. PATENT DOCUMENTS 4,520,624 A 6/1985 Kiyota et al.
5,609,021 A * 3/1997 Ma ............................ F01N 3/22
60/285

(Continued)

FOREIGN PATENT DOCUMENTS

DE 41 39 291 A1 6/1993
DE 100 31 924 A1 1/2002
(Continued)

OTHER PUBLICATIONS

DE 4139291 Translation, Ferdinand Piech, Jun. 3, 1993.*
(Continued)

*Primary Examiner* — Jesse S Bogue
(74) *Attorney, Agent, or Firm* — Crowell & Moring LLP

(57) ABSTRACT

An internal combustion engine. Exhaust gas is flowable through an exhaust tract. Secondary air is flowable through a secondary air conduit and is introducible into the exhaust tract via the secondary air conduit. A mixture having secondary air introduced into the exhaust tract and fuel components is ignitable in the exhaust tract by an ignition device. Fresh air flowing through a suction tract is introducible into a combustion chamber via the suction tract. The secondary air conduit is fluidically connected to the suction tract at a diversion point where a portion of the fresh air in
(Continued)

the suction tract is divertable from the suction tract by the secondary air conduit and is introducible into the exhaust tract as the secondary air. The fuel components that are contained in the exhaust gas, originate from the combustion chamber and reach the exhaust tract uncombusted from the combustion chamber.

6 Claims, 1 Drawing Sheet

(51) Int. Cl.
  *F01N 3/025* (2006.01)
  *F01N 3/20* (2006.01)
  *F01N 3/22* (2006.01)
  *F01N 3/30* (2006.01)
(52) U.S. Cl.
  CPC .............. *F01N 3/22* (2013.01); *F01N 3/30* (2013.01); *F01N 2240/14* (2013.01); *F01N 2340/06* (2013.01); *F01N 2410/00* (2013.01); *F01N 2550/14* (2013.01)
(58) Field of Classification Search
  CPC ............ F01N 2340/06; F01N 2410/00; F01N 2550/14
  See application file for complete search history.

(56) References Cited

U.S. PATENT DOCUMENTS

| | | | |
|---|---|---|---|
| 5,685,144 A * | 11/1997 | Ma ..................... | F01N 3/2882 60/284 |
| 6,354,078 B1 * | 3/2002 | Karlsson .............. | F01N 3/2006 60/305 |
| 6,523,342 B2 | 2/2003 | Kueper et al. | |
| 6,874,315 B2 * | 4/2005 | Nakatani .............. | F01N 3/0253 60/296 |
| 8,925,298 B2 * | 1/2015 | Pekrul ................. | F01N 3/227 60/289 |
| 9,151,200 B2 * | 10/2015 | Zhang .................. | F01N 13/009 |
| 9,303,557 B2 * | 4/2016 | Ulrey .................. | F02D 41/0007 |
| 9,371,756 B2 * | 6/2016 | Mori .................... | F01N 3/10 |
| 9,458,760 B2 * | 10/2016 | Morelli ............... | F02B 37/183 |
| 9,957,876 B2 * | 5/2018 | Zhang .................. | F02B 37/04 |
| 10,018,157 B2 * | 7/2018 | Jankovic ............. | F02D 41/1401 |
| 10,041,451 B2 * | 8/2018 | Zhang .................. | F02M 26/05 |
| 10,156,211 B1 * | 12/2018 | Martin ................ | F02D 41/0007 |
| 10,393,039 B2 * | 8/2019 | Ulrey .................. | F01N 13/107 |
| 10,415,513 B2 * | 9/2019 | Fischer ............... | F02B 37/18 |
| 10,655,576 B2 * | 5/2020 | Oh ....................... | F02M 26/65 |
| 10,844,775 B2 * | 11/2020 | Kelly .................. | F01N 3/0236 |
| 2007/0062189 A1 * | 3/2007 | Keppeler ............. | F01N 3/0807 60/605.1 |
| 2010/0186386 A1 * | 7/2010 | Tsujimoto ........... | F01N 3/0842 60/299 |
| 2012/0073270 A1 * | 3/2012 | Cox .................... | F01N 3/2013 29/888.011 |
| 2012/0315192 A1 * | 12/2012 | Tsujimoto ........... | F02B 37/24 422/109 |
| 2014/0060009 A1 * | 3/2014 | Zhang ................. | F01N 13/009 60/605.1 |
| 2017/0335748 A1 * | 11/2017 | Zhang ................. | F02D 41/0065 |
| 2018/0274436 A1 * | 9/2018 | Kemmerling ....... | F02B 37/162 |
| 2021/0239058 A1 * | 8/2021 | Sakata ................ | F01N 3/033 |

FOREIGN PATENT DOCUMENTS

| | | |
|---|---|---|
| DE | 100 38 724 A1 | 2/2002 |
| DE | 103 57 038 A1 | 7/2004 |
| DE | 10 2008 032 601 A1 | 1/2010 |
| DE | 10 2017 113 366 A1 | 12/2018 |
| WO | WO 2019/030315 A1 | 2/2009 |

OTHER PUBLICATIONS

PCT/EP2021/078564, International Search Report dated Jan. 26, 2022 (Two (2) pages).

German Search Report issued in German application No. 10 2020 007 000.0 dated Jul. 16, 2021, with Statement of Relevancy (Eight (8) pages).

German-language European Office Action issued in European Application No. 21 794 784.5-1004 dated Jul. 14, 2023 (3 pages).

\* cited by examiner

INTERNAL COMBUSTION ENGINE FOR A MOTOR VEHICLE, IN PARTICULAR FOR A MOTOR CAR

BACKGROUND AND SUMMARY OF THE INVENTION

The invention relates to an internal combustion engine for a motor vehicle, in particular for a motor car.

Such an internal combustion engine for a motor vehicle, in particular for a motor car, should for example already be taken as known from DE 100 38 7 24 A1. The internal combustion engine has an exhaust tract that can be flowed through by exhaust gas from at least one combustion chamber of the internal combustion engine and a secondary air conduit that can be flowed through by secondary air. The secondary air flowing through the secondary air conduit can be introduced into the exhaust tract by means of the secondary air conduit. The internal combustion engine additionally has an ignition device arranged in the exhaust tract, by means of which a mixture can be ignited, the mixture comprising the secondary air introduced into the exhaust tract and, in particular uncombusted and combustible fuel components. The internal combustion engine additionally has a suction tract that can be flowed through by fresh air, by means of which the fresh air flowing through the suction tract can be introduced into the combustion chamber. The fresh air can be a component of a combustion mixture that can comprise the fresh air, and optionally exhaust gas that has been fed back and/or unburned fuel. DE 100 31 924 A1 further discloses a method for checking the feasibility of at least one measure for heating a catalyst in the exhaust gas of an internal combustion engine. DE 10 2008 032 601 A1 additionally discloses a method for adjusting a state of an exhaust flow of an internal combustion engine of a motor vehicle.

The object of the present invention is to improve an internal combustion engine of the type specified in the introduction.

To improve an internal combustion engine of the type specified herein, it is provided according to the invention that the secondary air conduit is fluidically connected to the suction tract at a diversion point which is arranged downstream of a compressor arranged in the suction tract and designed to compress the fresh air and upstream of a throttle flap arranged in the suction tract, by means of which a quantity of the fresh air to be fed to the combustion chamber can be adjusted. At least a portion of the fresh air can be diverted from the suction tract by means of the secondary air conduit at the diversion point, and can be introduced into the exhaust tract as the secondary air. In other words, by means of the secondary air conduit, at least a portion of the fresh air can be diverted from the suction tract at the diversion point and introduced into the secondary air conduit. The portion of the fresh air from the suction tract diverted at the diversion point and introduced into the secondary air conduit is fed to the exhaust tract by means of the secondary air conduit, and introduced into the exhaust tract as the secondary air. This means that the diverted portion of the fresh air is used as the secondary air that is introduced into the exhaust tract and is used to combust the uncombusted and combustible fuel components contained in the exhaust gas, which originate from the combustion chamber and have reached the exhaust tract from the combustion chamber uncombusted.

It is further provided that the ignition device is designed as an ignition plug, by means of which the fuel components in the mixture comprising the secondary air can be easily, and thus cost- and space-efficiently ignited in a targeted manner as needed and then combusted.

Through the invention, in a cold start of the internal combustion engine, for example, a post-ignition or combustion of the fuel components in combination with the secondary air is achieved with particularly little temporal delay, such that for example an exhaust gas post-treatment device arranged in the exhaust tract for post-treating the exhaust gas can be effectively and quickly heated. A particularly low-emission operation of the internal combustion engine can thus be guaranteed.

A quick ignition of the mixture in the exhaust tract also described as an exhaust system is possible by means of the ignition plug, whereby for example an emission combustion can be represented. An emission combustion should be understood to mean that by igniting and combusting the mixture emissions potentially contained in the exhaust gas, in particular such as the uncombusted and combustible fuel components can be burned or combusted. Excessive emissions of uncombusted hydrocarbons (HC) can thus be avoided, for example. The exhaust gas post-treatment for example designed as a catalytic converter or comprising at least one catalytic converter can additionally be heated effectively and in a short period of time, and thus brought up to its light-off temperature particularly advantageously, such that the cold start or a cold start phase following a cold start can be kept particularly short. In comparison with other heating systems, the ignition plug is particularly simple, and thus cost-efficient.

The internal combustion engine is for example actuated with secondary air, i.e., with secondary air injection after or during its cold start. By this should be understood that secondary air is introduced into the exhaust tract, in particular injected. The secondary air bypasses all combustion chambers of the internal combustion engine, for example, and thus does not originate from the combustion chamber. According to the invention, the secondary air conduit serves a dual function. On the one hand, the secondary air conduit is used to use at least the specified portion of the fresh air from the suction tract as secondary air and to introduce the secondary air into the exhaust tract. On the other hand, the secondary air conduit can be used as thrust air recirculation conduit, in particular in combination with a thrust air recirculation valve, as the diversion point is arranged downstream of the compressor or of a compressor wheel and upstream of the throttle flap. If, for example, the fresh air is compressed by means of the compressor, and if the throttle flap then closes abruptly, then fresh air can be removed from the suction tract for example by means of the secondary air conduit, such that an excessive deceleration of the compressor wheel can be avoided by abruptly closing the throttle flap.

It is in particular conceivable that a valve element designed as a thrust air recirculation valve is assigned to the secondary air conduit, by means of which the portion, i.e., a quantity of the fresh air to be introduced into the secondary air conduit at the diversion point and to be introduced as the secondary air into the exhaust tract can be adjusted. In other words, the valve element is a so-called combination valve. On the one hand, the combination valve can be used to adjust the quantity of the fresh or secondary air to be introduced into the secondary air conduit. On the other hand, the combination valve can be used to divert at least a portion of the fresh air first arranged between the compressor wheel and the throttle flap from the suction tract. The invention thus effectively combines a secondary air system with a thrust air recirculation system or merges these systems. The number of parts and the costs of the internal combustion engine can thus be kept within a particularly low range.

It has proved particularly advantageous if at least a portion of the fresh air can be fed back as thrust recirculation air from the diversion point via the valve element to a point arranged downstream of the compressor, and at that point can be introduced into the suction tract. The invention thus combines a secondary air system with a thrust air recirculation system or merges these systems. The number of parts and the costs of the internal combustion engine can thus be kept within a particularly low range.

A further embodiment is characterized in that a turbine that can be driven by the exhaust gas is arranged in the exhaust tract. A particularly advantageous and efficient operation of the internal combustion engine can thus be obtained.

An introduction point is preferably provided at which the secondary air conduit is fluidically connected to the exhaust tract and the secondary air can be introduced into the exhaust tract from the secondary air conduit, whereby a particularly advantageous operation can be represented.

In a particularly advantageous embodiment of the invention, the introduction point is arranged in a bypass channel in parallel flow connection with the turbine, via which the turbine can be bypassed by at least a portion of the exhaust gas. The secondary air can thus be introduced into the exhaust tract without excessively influencing the turbine or its operation.

In an alternative embodiment of the invention, the introduction point is arranged downstream or upstream of the turbine in the exhaust tract and is in series flow connection with the turbine, whereby a particularly advantageous operation can be represented.

Furthermore, according to the invention, at least one or several ignition plugs are used in the exhaust tract, in particular between an output valve of the combustion chamber and the exhaust gas post-treatment device. By heating the ignition plugs, a rich combustion chamber mixture from the combustion chamber can for example be ignited in combination with the secondary air that has been introduced into the exhaust tract, and finally combusted, wherein for example the combustion chamber mixture and the secondary air can form the previously-specified mixture. Using the ignition plug, the combustion chamber mixture can be combusted in connection with the secondary air as needed and in particular be combusted early, such that the cold start can be carried out within a short space of time and advantageously in particular with regard to emissions and comfort.

Further advantages, features and details of the invention result from the following description of preferred exemplary embodiments and with reference to the drawings. The features and combinations of features specified previously in the description and the features and combinations of features specified in the following description of figures and/or shown in the figures alone can be used not only in the respectively specified combinations, but also in other combinations or in isolation without leaving the scope of the invention.

DETAILED DESCRIPTION OF THE DRAWINGS

Identical or functionally identical elements are provided with the same reference signs in the figures.

Figure 1:
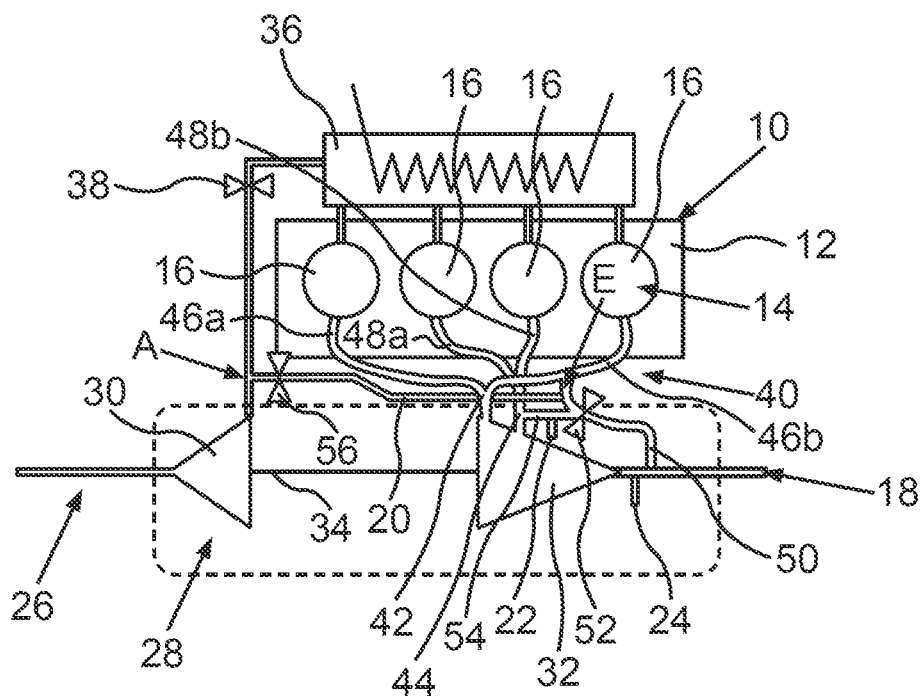
FIG. 1 shows a schematic depiction of an internal combustion engine according to the invention according to a first embodiment.

FIG. 1 shows, in a schematic depiction, an internal combustion engine 10 presently designed as a reciprocating piston engine for a motor vehicle, in particular for a motor car preferably designed as a passenger car. The motor vehicle in its completely produced state thus comprises the internal combustion engine 10 can be driven by internal combustion by means of the internal combustion engine 10. The internal combustion engine 10 comprises a cylinder housing 12, by which several cylinders 14 of the internal combustion engine 10 are formed or delimited. The respective cylinder 14 partially delimits a respective combustion chamber 16 of the internal combustion engine 10. During a fired operation of the internal combustion engine 10, combustion processes take place in the combustion chambers 16, from which exhaust gas of the internal combustion engine 10 results.

The internal combustion engine 10 has an exhaust tract 18 that can be flowed through by the exhaust gas from the combustion chambers 16. The internal combustion engine 10 additionally comprises a secondary air conduit 20 that can be flowed through by secondary air, by means of which the secondary air flowing through the secondary air conduit 20 can be introduced into the exhaust tract 18, in particular at an introduction point E. The secondary air flowing through the secondary air conduit 20 bypasses the or all combustion chambers 16 of the internal combustion engine 10 and thus does not flow through the combustion chambers 16 or flows through no combustion chamber 16 of the internal combustion engine 10.

The internal combustion engine 10 additionally has at least one or several ignition plugs 22, 24 arranged in the exhaust tract, wherein a mixture in the exhaust tract 18 can be ignited by means of the respective ignition plug 22 or 24. The mixture comprises the secondary air introduced into the exhaust tract 18 and uncombusted and thus still combustible fuel components, which have avoided at least one of the combustion chambers 16 uncombusted and reached the exhaust tract 18. The internal combustion engine 10 additionally comprises a suction tract 26 that can be flowed through by fresh air, by means of which the fresh air flowing through the suction tract 26 is fed to and into the combustion chambers 16.

The internal combustion engine 10 comprises an exhaust turbocharger 28 that has a compressor 30 arranged in the suction tract 26 and a turbine 32 arranged in the exhaust tract 18. The turbine 32 can be driven by the exhaust gas, wherein the compressor 30 can be driven by the turbine 32, in particular via a shaft 34 of the exhaust turbocharger 28. By driving the compressor 30, the fresh air flowing through the suction tract 26 is compressed by means of the compressor 30.

An intercooler 36 is arranged downstream of the compressor 30 and in particular upstream of the combustion chambers 16 in the flow direction of the fresh air flowing through the suction tract 26, by means of which the fresh air is cooled before it flows into the combustion chambers 16. A throttle flap 38 is additionally arranged in the suction tract 26. The throttle flap 38 is arranged upstream of the intercooler 36 and downstream of the compressor 30. By means of the throttle flap 38, a quantity of the fresh air to be fed to the combustion chambers 16 is adjusted. In FIG. 1 it can further be seen that, in particular by means of an exhaust manifold 40 arranged in the exhaust tract 18, two first ones of the combustion chambers 16 are combined into a first exhaust flow 42 and two second ones of the combustion chambers 16 are combined into a second exhaust flow 44. A respective first exhaust conduit 46*a* or 46*b*, for example formed by the exhaust manifold 40, is assigned to the respective first combustion chamber 16, wherein the exhaust conduits 46*a, b* are combined into the shared exhaust flow 42 or lead into the exhaust flow 42. A respective second exhaust conduit 48*a* or 48*b* is assigned to the respective second combustion chamber 16, wherein the exhaust conduits 48*a* and 48*b* lead into the shared exhaust flow 44 or are combined into the exhaust flow 44. The turbine 32 is thus preferably designed as a twin-pipe turbine.

A bypass channel 50 is assigned to the turbine 32, which diverts away from the exhaust conduit 46*b*. In relation to the exhaust conduits 46*a, b* and 48*a, b*, the bypass channel 50 preferably diverts exclusively away from the exhaust conduit 46*b*. The bypass conduit 50 is fluidically connected to the exhaust tract 18 at a first connection point and at a second connection point. In particular, the bypass channel 50 is connected to the exhaust conduit 46*b* at the first connection point. At the first connection point, at least a part of the exhaust gas flowing through the exhaust conduit 46*b* can be diverted from the exhaust conduit 46*b* by means of the bypass channel 50 and introduced into the bypass channel 50. The exhaust gas introduced into the bypass channel 50 is guided to the second connection point by means of the bypass channel 50 and introduced into the exhaust tract 18 again at the second connection point. The first connection point is arranged upstream of the turbine 32, while the second connection point is arranged downstream of the turbine 32. The exhaust gas flowing through the bypass channel 50 thus bypasses the turbine 32. This means that the exhaust gas flowing through the bypass channel 50 does not drive the turbine 32. A valve element 52 is assigned to the bypass channel 50, by means of which a quantity of the exhaust gas flowing through the bypass channel 50 can be adjusted. A power of the turbine 32, and thus a boost pressure at which the fresh air is compressed by means of the compressor 30 can thus be adjusted, in particular controlled, by means of the bypass channel 50 and by means of the valve element 52.

The exhaust tract 18 further has a connecting conduit 54, via which the bypass channel 50 and the exhaust flow 44 are or can be fluidically connected to each other. The valve element 52 is also described as a wastegate flap or wastegate valve, as the power of the turbines 32 and the boost pressure can be adjusted, in particular controlled by means of the valve element 52. The valve element 52 is additionally described as a flow connection lap or as a flow connection valve, as a quantity of the exhaust gas flowing through the connecting conduit 54 can for example be adjusted by means of the valve element 52. If the valve element 52 is closed, for example, such that the bypass channel 50 is closed, then the exhaust gas that flows into the bypass channel 50 at the first connection point for example flows into the exhaust flow 44 via the connecting conduit 54, such that for example the exhaust flow 44 is thus fluidically connected to the bypass channel 50 or to the exhaust conduit 46 *b* via the connecting conduit 54.

It can be seen that the ignition plug 22 is arranged in the connecting conduit 54. The ignition plug 24 is arranged downstream of the turbine 32. It can be seen that the bypass channel 50 is in parallel flow connection with the turbine 32. The ignition plug 24 is in parallel flow connection with the turbine 32 and arranged downstream of the turbine 32 in the exhaust tract 18. The ignition plug 22 can be very squarely in flow connection with the turbine 32 and be arranged upstream of the turbine 32, or the ignition plug 22 is in parallel flow connection with the turbine 32.

To obtain the secondary air in a particularly simple, and thus cost-, space- and weight-efficient manner, the secondary air conduit 20 for example fluidically connected to the exhaust tract 18 at the introduction point E is fluidically connected to the suction tract 26 at a diversion point A, which is arranged downstream of the compressor 30 and upstream of the throttle flap 38 in the flow direction of the fresh air flowing through the suction tract 26. By means of the secondary air conduit 20, at least a portion of the fresh air can be diverted from the suction tract 26 at the diversion point A and introduced into the secondary air conduit 20. The fresh air introduced into the secondary air conduit 20 flows through the secondary air conduit 20 and is fed to the introduction point E by means of the secondary air conduit 20 and introduced into the exhaust tract 18 as the secondary air at the introduction point E. A valve element 56 is assigned to the secondary air conduit 20, by means of which the portion and thus a quantity of the secondary or fresh air flowing through the secondary air conduit 20 can be adjusted. The valve element 56 is preferably a combination valve also simply described as a combi valve, as on the one hand the valve element 56 is used to adjust the portion, i.e., to adjust the quantity of the secondary air flowing through the secondary air conduit 20. On the other hand, the valve element 56 is for example designed as a thrust air recirculation valve, via which for example, when the throttle flap 38, having first been opened, is closed quickly, at least a portion of the fresh air first arranged between the compressor 30 and the throttle flap 38 can be diverted out of the suction tract 26. If the throttle flap 38 is closed abruptly, an excessive deceleration of the compressor 30 or its compressor wheel can thus be avoided. From FIG. 1, it can be seen that a secondary air system is combined with a thrust air recirculation system to provide the secondary air, such that overall, in comparison with conventional solutions, actuators and pumps are not required. The secondary air system and the thrust air recirculation system can thus be obtained in a weight-, space- and cost-efficient manner.

For example, the introduction point E is arranged in the exhaust manifold 40, such that the secondary air is injected or introduced into the exhaust manifold. The introduction or injection of the secondary air into the exhaust tract 18 is also described as air injection or secondary air injection. The ignition plug 24 is preferably arranged in the region of an outlet of the turbine 32. If, for example, at least one of the combustion chambers 16 provides a rich combustion chamber mixture, which comprises uncombusted, and thus combustible and preferably liquid fuel, including the previously specified fuel components, then the rich combustion chamber mixture is mixed with the secondary air, whereby the previously specified mixture is formed. By means of the respective ignition plug 22 or 24, the mixture can be ignited early and in a targeted manner, such that a particularly low-emission operation can be represented.

Figure 2:
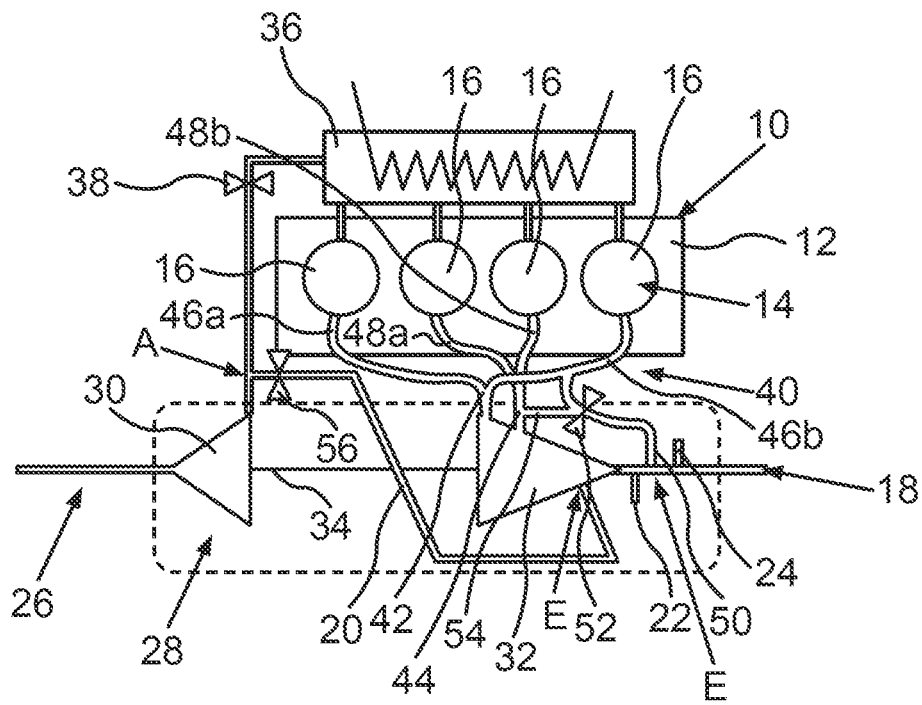
FIG. 2 shows a schematic depiction of the internal combustion engine according to a second embodiment.

FIG. 2 shows a second embodiment of the internal combustion engine 10. In the second embodiment, the introduction point E is for example spaced apart from the exhaust manifold, and in particular arranged downstream of the turbine 32, in particular at an outlet of a turbine rotor of the turbine 32 of which the turbine rotor for example comprises a turbine wheel of the turbine. It is further conceivable that the introduction point E is arranged in a course of the turbine rotor. This can in particular be understood to mean that, for example, the introduction point E is arranged in flow connection at the same height as the turbine wheel in the flow direction of the exhaust gas flowing through the exhaust tract 18.

An advantage of the internal combustion engine 10 is that the secondary air can be injected into a region having only low counter-pressure. A sufficient pressure drop thus always exists between the diversion point A arranged downstream of the compressor 30 and the introduction point E. Additionally, a flow turbulence after the turbine 32 can be used to combust the secondary air with the fuel components or with the rich combustion chamber mixture particularly advantageously. The ignition plugs 22 and 24 are additionally used to ignite the mixture, also described as firing, whereby the mixture can be effectively, cost-efficiently and space-efficiently ignited early.

An exhaust gas post-treatment device for post-treating the exhaust gas is preferably arranged downstream of the respective ignition plug 22 or 24 and also downstream of the introduction point E in the flow direction of the exhaust gas. The exhaust gas post-treatment device comprises, for example, at least one catalytic converter, which can be designed as a three-way catalytic converter or as an SCR catalytic converter. By igniting and combusting the mixture, the exhaust gas post-treatment device can be particularly quickly and efficiently heated, such that a particularly efficient heating, in particular catalyst heating, can be obtained, as a turbine housing of the turbine 32 does not need to be heated. In particular, components already present, in particular and above all in the form of the thrust air recirculation valve can be used to represent a particularly low-emission operation of the internal combustion engine 10.

LIST OF REFERENCE CHARACTERS

- 10 internal combustion engine
- 12 cylinder housing
- 14 cylinder
- 16 combustion chamber
- 18 exhaust tract
- 20 secondary air conduit
- 22 ignition plug
- 24 ignition plug
- 26 suction tract
- 28 exhaust turbocharger
- 30 compressor
- 32 turbine
- 34 shaft
- 36 intercooler
- 38 throttle flap
- 40 exhaust manifold
- 42 exhaust flow
- 44 exhaust flow
- 46a, 46b exhaust conduit
- 48a, 48b exhaust conduit
- 50 bypass channel
- 52 valve element
- 54 connecting conduit
- 56 valve element
- A diversion point
- E introduction point

The invention claimed is:

1. An internal combustion engine for a motor vehicle, comprising:
    an exhaust tract fluidically coupled to a combustion chamber such that exhaust gas from the combustion chamber flows through the exhaust tract;
    a turbine in the exhaust tract and configured to be driven by the exhaust gas;
    a suction tract fluidically coupled to the combustion chamber so as to introduce air flowing in the suction tract into the combustion chamber;
    an intercooler in the suction tract;
    a throttle flap in the suction tract upstream of the intercooler and configured to adjust the amount of air introduced into the combustion chamber via the suction tract;
    a compressor in the suction tract upstream of the throttle flap and configured to compress the air flowing in the suction tract;
    a secondary air conduit fluidically coupling the suction tract to the exhaust tract at a diversion point downstream of the compressor so as to introduce a portion of the air flowing in the suction tract into the exhaust tract onto a turbine wheel of the turbine; and
    an ignition plug in the exhaust tract downstream of the turbine and configured to ignite a mixture of: (a) the air introduced into the exhaust tract, and (b) un-combusted fuel components in the exhaust gas.

2. The internal combustion engine according to claim 1, further comprising valve element, wherein the portion is adjustable by the valve element.

3. The internal combustion engine according to claim 2, wherein the valve element is a combination valve.

4. An internal combustion engine for a motor vehicle, comprising:
    an exhaust tract fluidically coupled to a combustion chamber such that exhaust gas from the combustion chamber flows through the exhaust tract;
    a turbine in the exhaust tract and configured to be driven by the exhaust gas;
    a suction tract fluidically coupled to the combustion chamber so as to introduce air flowing in the suction tract into the combustion chamber;
    an intercooler in the suction tract;
    a throttle flap in the suction tract upstream of the intercooler and configured to adjust the amount of air introduced into the combustion chamber via the suction tract;
    a compressor in the suction tract upstream of the throttle flap and configured to compress the air flowing in the suction tract;
    a secondary air conduit fluidically coupling the suction tract to the exhaust tract at a diversion point downstream of the compressor so as to introduce a portion of the air flowing in the suction tract into the exhaust tract into a bypass channel upstream of a wastegate valve, wherein the bypass channel bypasses the turbine in parallel flow with the exhaust tract; and
    an ignition plug in the exhaust tract downstream of the turbine and configured to ignite a mixture of: (a) the air introduced into the exhaust tract, and (b) un-combusted fuel components in the exhaust gas.

5. The internal combustion engine according to claim 4, further comprising valve element, wherein the portion is adjustable by the valve element.

6. The internal combustion engine according to claim 5, wherein the valve element is a combination valve.

* * * * *